(12) United States Patent
Williams

(10) Patent No.: US 7,251,709 B2
(45) Date of Patent: Jul. 31, 2007

(54) STORAGE DEVICE HAVING A LATERAL STORAGE DIRECTOR

(75) Inventor: Larry Lynn Williams, Los Altos, CA (US)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 496 days.

(21) Appl. No.: 10/728,012

(22) Filed: Dec. 3, 2003

(65) Prior Publication Data

US 2005/0125604 A1 Jun. 9, 2005

(51) Int. Cl.
*G06F 13/12* (2006.01)

(52) U.S. Cl. .............................. 711/114; 710/22; 714/6; 718/105

(58) Field of Classification Search ........ 711/111–112, 711/114, 162; 714/2, 6; 710/22; 360/48, 360/75; 718/105
See application file for complete search history.

(56) References Cited

U.S. PATENT DOCUMENTS

| | | | |
|---|---|---|---|
| 5,210,866 A | 5/1993 | Milligan et al. | 395/575 |
| 5,535,399 A | 7/1996 | Blitz et al. | 395/750 |
| 5,566,316 A | 10/1996 | Fechner et al. | 395/441 |
| 5,867,733 A * | 2/1999 | Meyer | 710/74 |
| 6,108,724 A * | 8/2000 | Din | 710/52 |
| 6,151,665 A | 11/2000 | Blumenau | 711/162 |
| 6,304,948 B1 | 10/2001 | Motoyama et al. | 711/162 |
| 6,535,934 B2 * | 3/2003 | Troxel et al. | 710/31 |
| 6,859,846 B2 * | 2/2005 | Swidler et al. | 710/8 |
| 6,925,505 B2 * | 8/2005 | Wang | 710/21 |
| 2003/0023818 A1 | 1/2003 | Archibald, Jr. et al. | 711/154 |
| 2004/0093607 A1 * | 5/2004 | Elliott | 719/326 |
| 2004/0103261 A1 * | 5/2004 | Honda et al. | 711/202 |
| 2004/0103337 A1 * | 5/2004 | Smith | 714/2 |

* cited by examiner

*Primary Examiner*—Pierre Bataille
*Assistant Examiner*—Hetul Patel
(74) *Attorney, Agent, or Firm*—Bracewell & Giuliani LLP

(57) ABSTRACT

A storage device such as a disk drive is provided with a lateral storage director. The lateral storage director is capable of self-assessing the status of the storage device. The lateral storage director also enables one storage device to transfer data files to another storage device over a communications link without the supervision of a host computer.

12 Claims, 12 Drawing Sheets

STORAGE DEVICE HAVING A LATERAL STORAGE DIRECTOR

BACKGROUND OF THE INVENTION

1. Field of the Invention

The present invention relates to a storage device such as a disk drive that has a lateral storage director which allows the storage device to communicate directly with other storage devices via a communications link.

2. Description of the Background Art

Storage devices such as disk drives, optical drives, flash memory, tape drives and the like are used to store most of the digital data in contemporary computer systems. Typically, optical and tape drives have slower access times and are therefore used for storing data which does not need to be accessed very frequently. Disk drives, having faster access times, are customarily used to store the data files which are more frequently required in data processing applications.

In larger computer systems there are typically groups of disk drives and other storage devices to accommodate storage requirements. The groups of disk drives may be organized into RAID groups in order to protect and recover the data if a single disk drive fails. In a small stand-alone computer there may be only one disk drive. However, increasingly, small computer systems have more than one disk drive or other storage device. A second disk drive may be used in a mirroring arrangement; or, a second disk drive may simply be available for use should the first disk drive become unavailable because of full utilization of capacity or a failure.

Disk drives and other storage devices are not commonly provided with significant self initiative. In most computer systems, the status of the disk drive, including remaining capacity and predictive failure functions, is learned by the host or a separate storage system controller after issuing a command to the disk drive. If the status of the disk drive indicates that some corrective action should be taken, then the host or storage system controller must initiate the action by issuing commands to the disk drive. This requires substantial computing resources to be used to manage storage device load balancing and storage device failure indicators.

What is needed is a storage device with the capability of recognizing the need for such tasks as load balancing and responding to predictive failure indicators. Furthermore, what is needed is a storage device which after recognition of the need for a task is capable of self initiating the task. Finally, what is needed is a storage device which can cooperate directly with another storage device over a communications link to transfer data files.

SUMMARY OF THE INVENTION

In a preferred embodiment, the invention provides a storage device having a lateral storage director (LSD). The LSD allows the storage device to self monitor the status of performance parameters such as remaining storage capacity, predictive failure indicators, and the like. The LSD enables a storage device to communicate directly with other storage devices each having an LSD over a communications link. The LSD also allows a storage device to transfer data files to and from another storage device without requiring the involvement or cooperation of a host or data subsystem controller. Thus, a group of storage devices, each including an LSD, has a significantly improved response time in moving critical data files when responding to a impending storage device failure. In addition, substantially reduced computational resources are required to implement this protection. Consequently, the risk of losing critical data files is reduced.

In one embodiment, the invention provides a storage device having an LSD. The LSD has a control program, a data file table, an address, and a file of addresses.

In another embodiment, the invention provides a method of using a storage device having an LSD to transfer data files to a second storage device when a possible problem is indicated from a monitored performance parameter. This transfer of data files may occur without using the computing resources of the host or subsystem controller.

In another embodiment, the invention provides for a method of using an LSD to transfer data files from a disk drive which has limited remaining storage capacity to a disk drive which has more remaining storage capacity.

In another embodiment, the invention provides a method of using a storage device having an LSD to transfer data files directly to another storage device which is not equipped with an LSD. In this embodiment, the LSD issues host emulating commands.

A storage device having an LSD conserves computing resources when carrying out tasks such as data file transfers. In addition, the tasks are carried out much more efficiently. The subsequent reduction in the time required to transfer data files is particularly important when offloading data files from a failing storage device.

Other aspects and advantages of the present invention will become apparent from the following detailed description, which, when taken in conjunction with the drawings, illustrate by way of example the principles of the invention.

BRIEF DESCRIPTION OF THE DRAWINGS

The present invention and best mode of operation will be described in detail with reference to the accompanying drawings, in which.

DETAILED DESCRIPTION OF THE INVENTION

Figure 1:
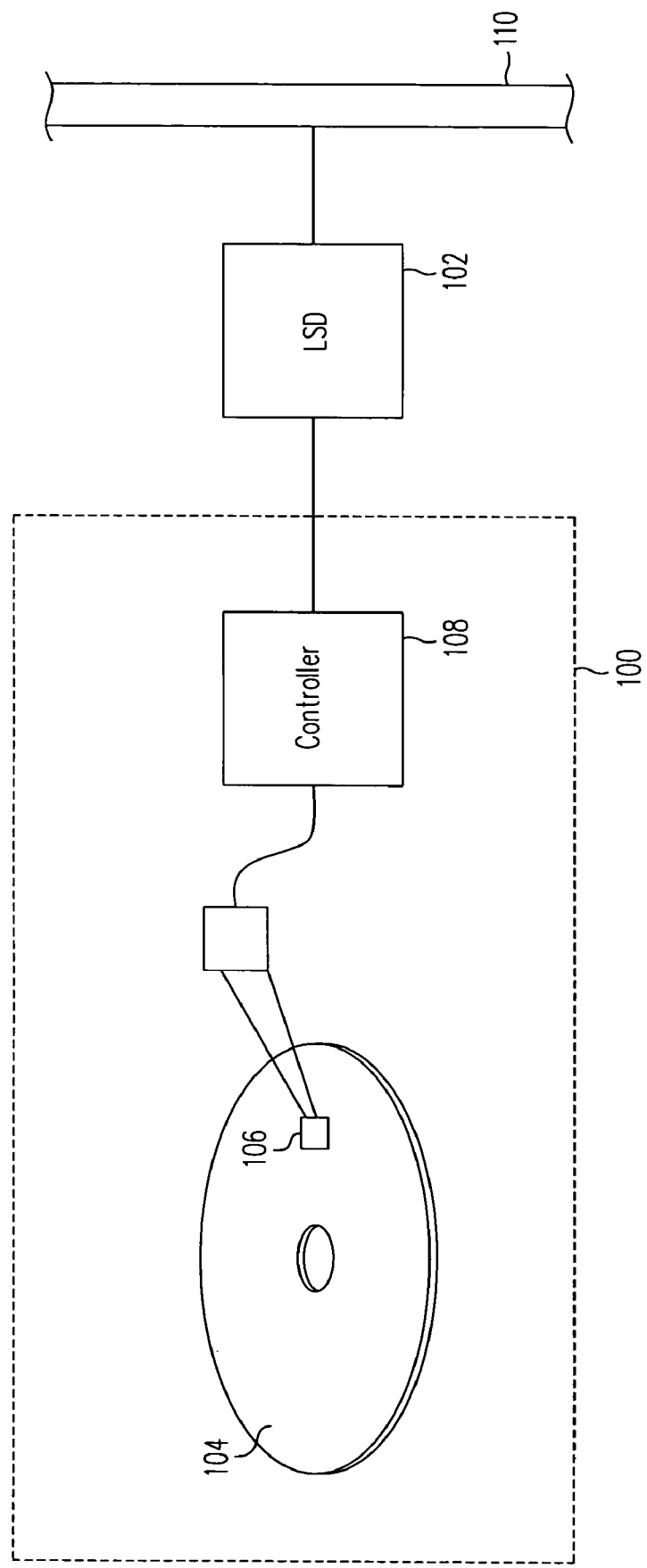
FIG. 1 illustrates a logical view of disk drive having an LSD.

As shown in the drawings and discussed in detail below, the invention is embodied in a storage device such as a disk drive having a lateral storage director (LSD). The LSD enables the disk drive to communicate directly with another disk drive, self monitor operating status, and initiate or accept data file transfers with other disk drives. A disk drive equipped with an LSD significantly conserves computing resources and more rapidly transfers data files from an ailing disk drive.

FIG. 1 illustrates a schematic logical overview of a disk drive 100 including an LSD 102. Any storage device such as an optical drive, a tape drive, and the like may include an LSD. The common features of these storage devices is a storage medium, a transducer to record and read back data from the storage medium, and a controller to control operations of the storage device. However, disk drives are ubiquitous in computing systems and the example of using a disk drive will be discussed here in detail to illustrate one set of embodiments of the present invention.

A disk drive (100 in FIG. 1) typically has at least one disk 104 for storing digital data. A recording head 106, usually having a separate read element and write element, is used for reading data from the disk 104 and writing data to the disk 104. A disk drive controller 108 controls the operation of the disk drive 100 including maintaining the recording head 106 on the desired track of data, sequencing read and write operations, and the like. Typically, a disk drive 100 is connected with a communications link 110. The communications link 110 may conveniently be a computer communications link such as a computer bus or computer network. The communications link 110 may also be a dedicated custom link, a simple telephone line, a radio link, or the like. In the example illustrated in FIG. 1, the LSD 102 is placed in the connection path between the disk drive 100 and the communications link 110. The communications link 110 in a simple computer system may be the local bus which connects the disk drive 100 with the local central processing unit (not shown). In a storage subsystem having many disk drives, the communications link 110 may be the local network which couples each disk drive with the host. The LSD 102 (discussed in detail below) may include a TCP/IP address which enables the Internet to be used as the communications link 110. The physical embodiment of the LSD 102 is most conveniently implemented by a program of computer commands useable by the disk drive controller 108. Alternatively, the LSD 102 may be embodied using a microprocessor mounted on a separate circuit board (not shown). While the function of the LSD 102 is separate from the physical disk drive 100, the LSD 102 can be, but need not be, a separate physical entity.

Figure 2:
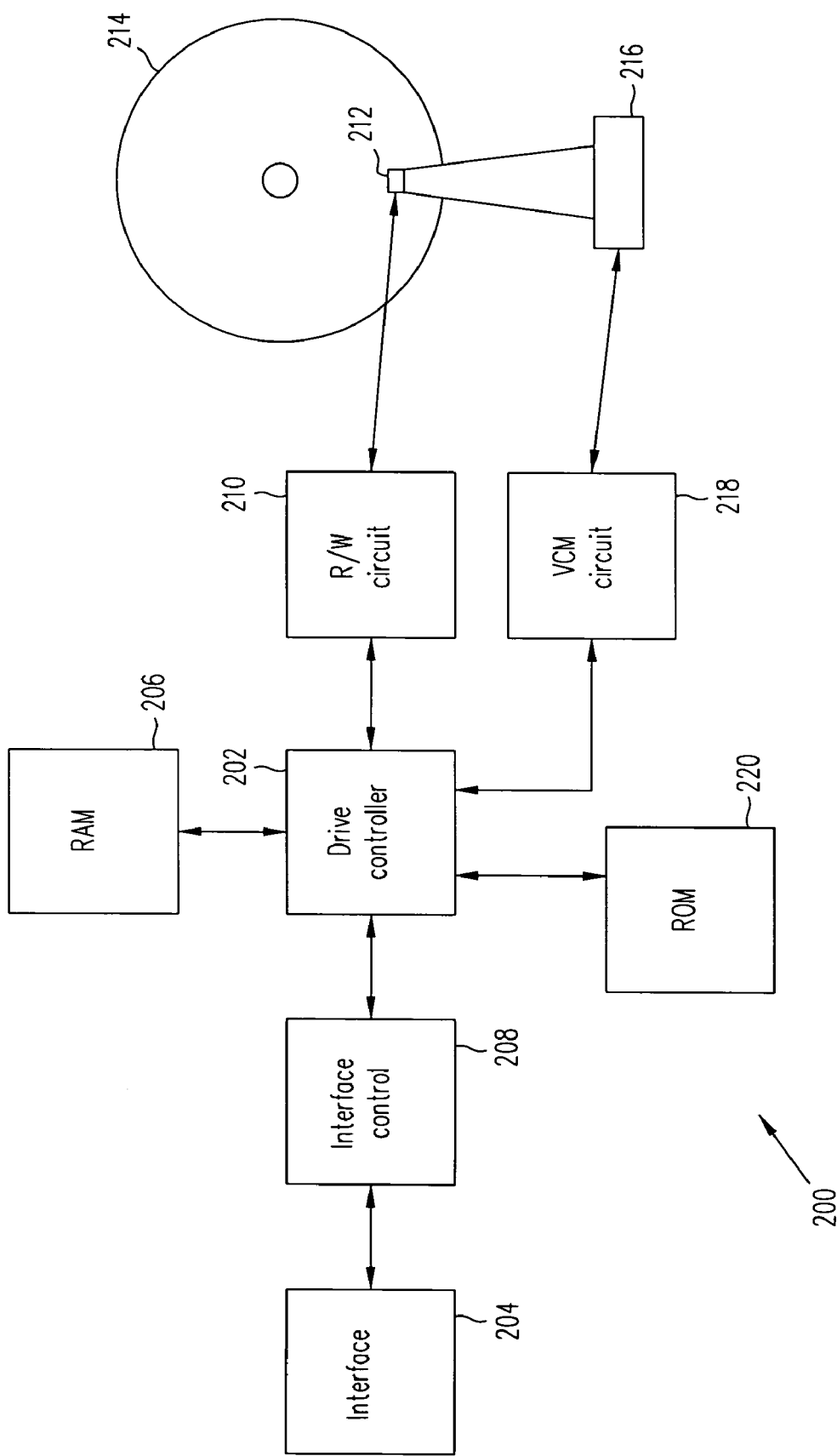
FIG. 2 illustrates the architecture of a typical disk drive according to the prior art.

FIG. 2 illustrates a more detailed view of a typical disk drive 200 which does not have an LSD. A disk drive controller 202, typically a microprocessor, controls the operation of the disk drive 200. Digital information is transmitted to and from the device through an interface 204, commonly a SCSI bus or a Fibre channel. The interface 204 is operated with an interface controller 208 which is controlled using the drive controller 202. When data to be written on the disk is supplied by the host (not shown), the drive controller 202 holds the supplied data in cache memory, also known as random access memory (RAM) 206, and sequences the data through a read/write circuit 210 to a recording head 212. The recording head 212, typically having a separate read and write element (not shown), then writes the data onto a disk 214. If the host requests a read operation, the read element of the recording head 212 is used to read data from the disk 214. The read data is typically stored in RAM 206 and then passed through the interface 204. The radial position of the recording head 212 is determined by an actuator including a voice coil motor (VCM) 216 and a VCM circuit 218. The program containing the microcode for controller operation is commonly stored in read only memory (ROM).

As illustrated in FIG. 2, a conventional disk drive which does not have an LSD is essentially a slave to the host. Commands are received from the host and subsequently data is passed to or from the host. The disk drive ordinarily does not initiate communication with the host or other disk drives.

Figure 3:
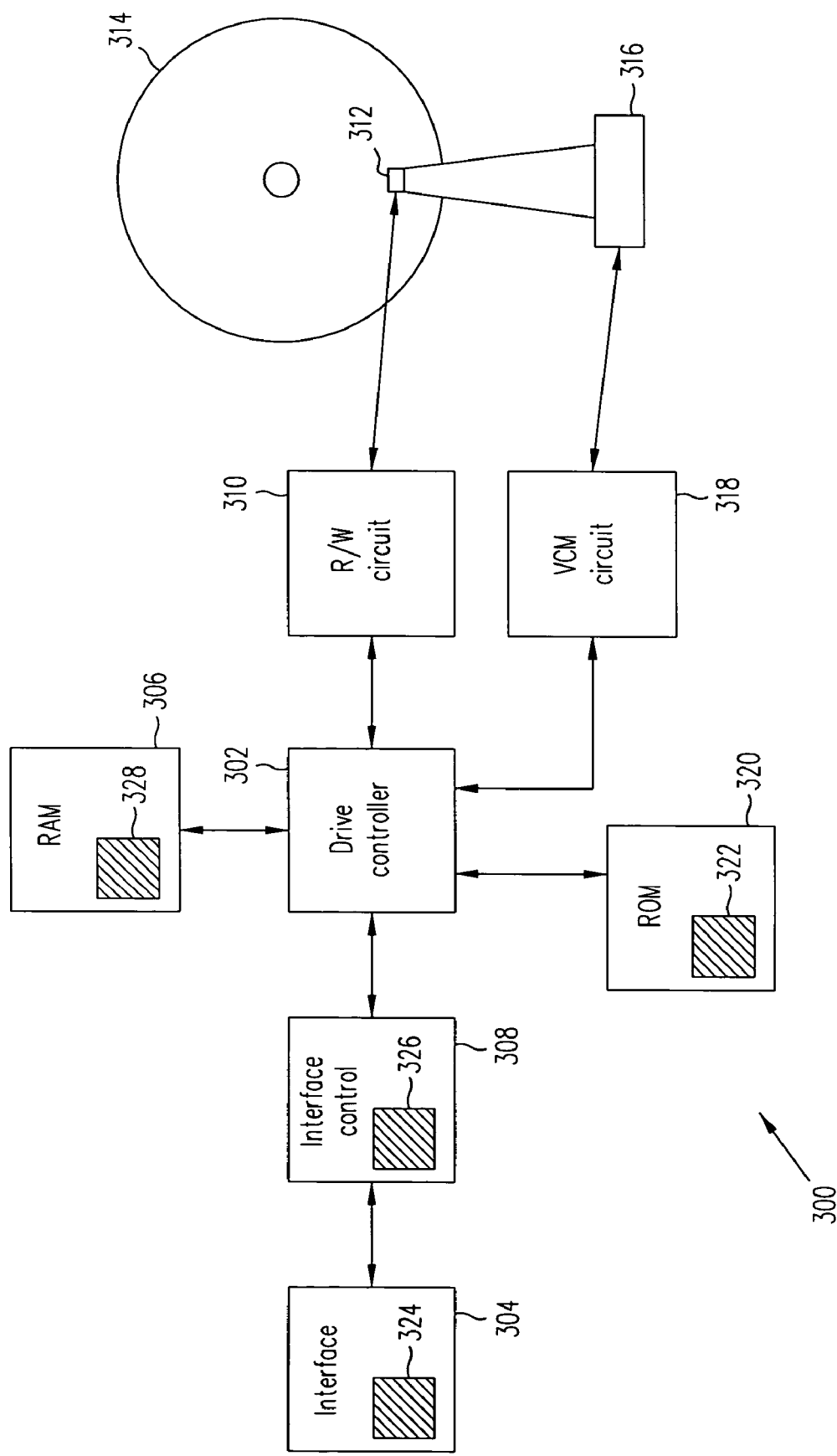
FIG. 3 illustrates the architecture of an exemplary disk drive having an LSD.

FIG. 3 illustrates a more detailed view of a disk drive having a LSD. In FIG. 1 a logical view of the disk drive having an LSD was illustrated. The disk drive having an LSD illustrated in FIG. 3 is an embodiment of a practical implementation of an LSD. The features and operational capabilities existing in the prior art disk drive (illustrated in FIG. 2) also exist in the disk drive having an LSD (illustrated in FIG. 3). For example, there is a drive controller 302, RAM 306, a read/write circuit 310, a disk 314, a recording head 312, a VCM 316, a VCM circuit 318, ROM 320, an interface 304, and an interface control 308. To include an LSD, there is a portion 322 of ROM 320 set aside for the computer instructions, also known as microcode, needed for the drive controller 302 to perform LSD operations. The RAM 306 also needs a portion 328 set aside for the flags and registers needed for LSD operation (described in detail below). A standard interface 304 such as SCSI or the like may be used for a disk drive having an LSD. However, a disk drive having an LSD, in addition to a conventional interface, may have an unconventional interface 324 such as a direct attachment to an Internet port or the like. Additional control circuitry 326 may be required for an unconventional interface 324.

Figure 4:
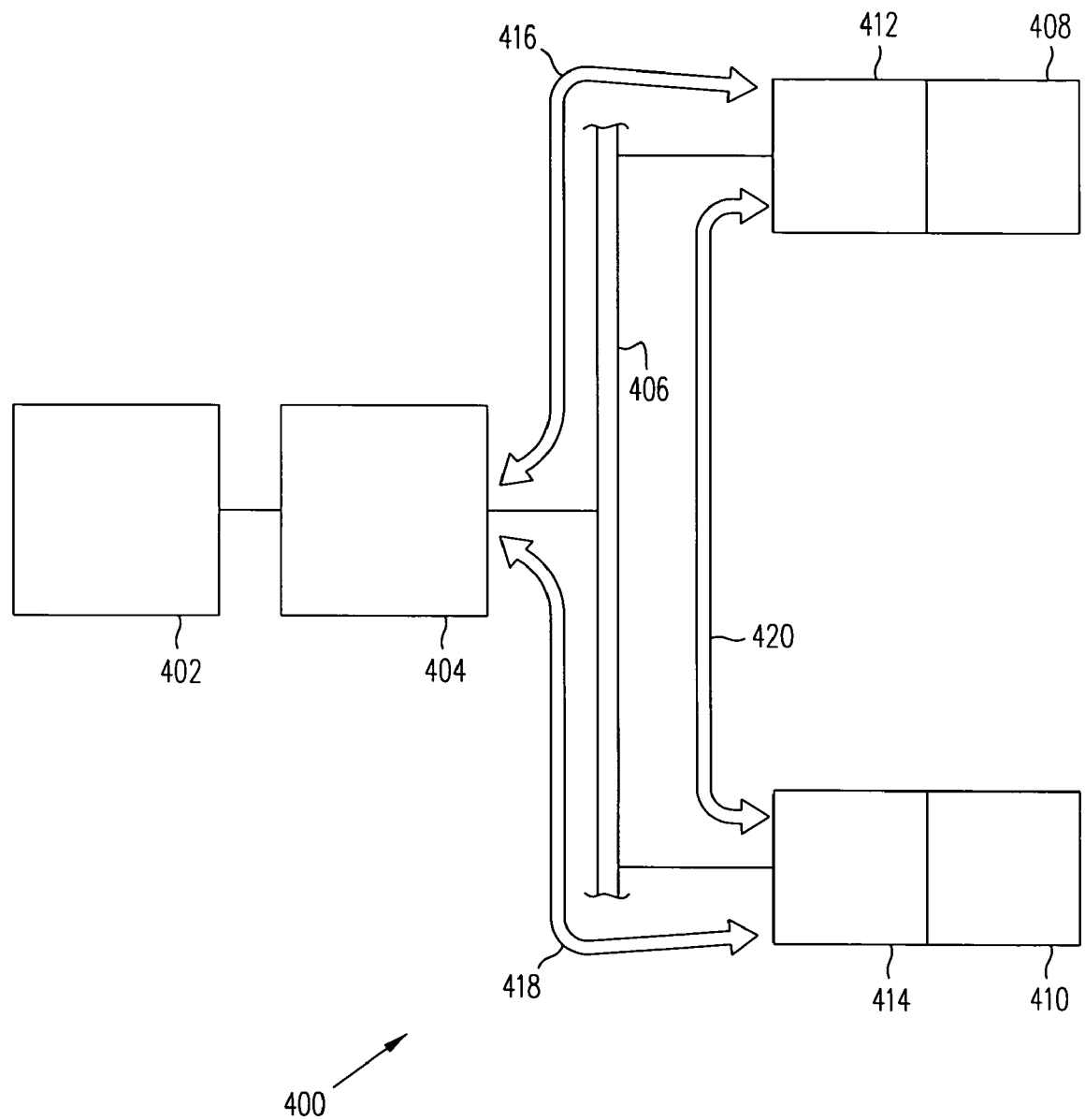
FIG. 4 illustrates a computer system having two disk drives each having an LSD.

FIG. 4 illustrates a computer system having one host 402, one storage controller 404, a communications link 406, and two disk drives 408, 410. Each of the disk drives 408, 410 has an LSD 412, 414. The host 402 may command the storage controller 404 to pass data files to or from the first disk drive 408 along the data path 416. The data path 416 represents a connection from the storage controller to the disk drive 408 through the communications link 406. Likewise the host may command the storage controller to pass data files to or from the second disk drive along the data path 418. The passing of data files between the host and the disk drives is well known and is considered normal operation in a computer system.

The presence of an LSD in each disk drive includes an additional, novel capability of allowing the two disk drives to communicate directly over the communications link along a data path indicated by reference number 420 in FIG. 4.

Figure 5:
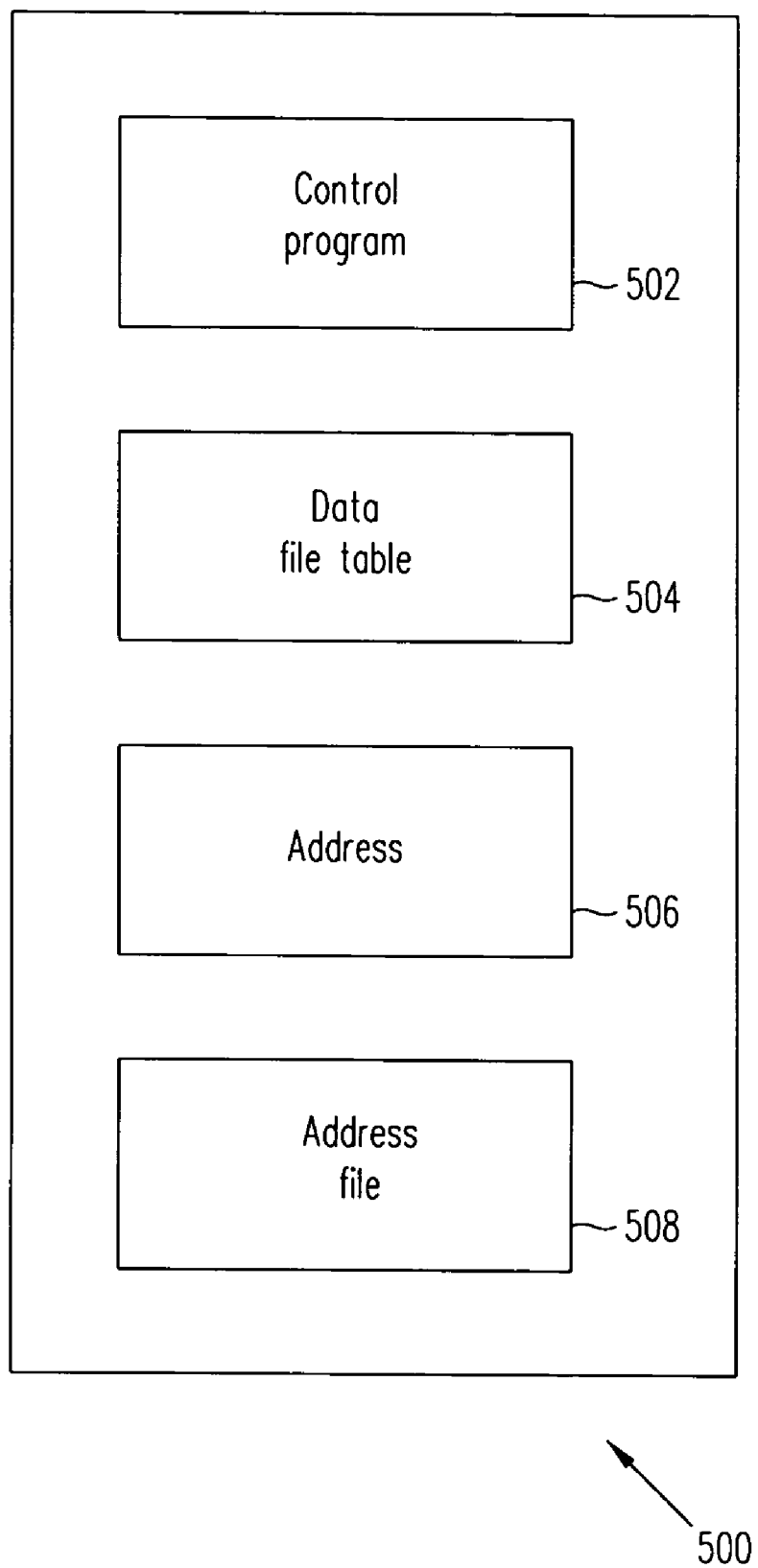
FIG. 5 illustrates some of the components of an exemplary LSD.

One embodiment 500 of an LSD and LSD components is illustrated in FIG. 5. The LSD 500 in FIG. 5 includes a control program 502 and a file table 504. The location of data files stored within the disk drive is stored in the file table 504. The LSD may also have the capability of determining the available storage space from the data file table 504. The LSD may use a file table which already exists in a disk drive; or, a separate file table used only by the LSD may be created. The file table 504 may exist in RAM only, or alternatively the file table may be temporarily in RAM and then stored on the disk as a data file. The file table 504 may be queried by the host to determine the location of a specific data file. When a new data file is stored on the disk drive, the file table 504 is updated so that the host may find the data file. In a like manner, when a data file is deleted from a disk drive, the file table 504 is also updated. A deleted data file need not necessarily be physically erased. Instead, the space occupied by the deleted file may be recognized as available to be overwritten with a new data file. A specific communications link address 506 for the specific disk drive is also included in the LSD 500. The communications link address 506 is conveniently established at initialization (described in detail below). The communications link address 506 allows the disk drive to be recognized by another disk drive connected with the communications link. Finally, the LSD 500 contains an address file 508 of other disk drives equipped with an LSD and connected with the communications link. The address file 508 is compiled upon initialization and then updated when a storage device is added or removed from the communications link.

The initialization of a disk drive having an LSD may be accomplished by physically connecting the disk drive to the appropriate communications link and manually assigning a communications link address. Alternatively, upon connection with the communications link, the control program (502 in FIG. 5) may send a query to determine the presence of other disk drives equipped with an LSD. For example, if a disk drive is using a TCP/IP protocol through a LAN, an address resolution protocol (ARP) query may be sent through the network. Each of the other disk drives present will respond with a reversed address resolution protocol (RARP) which includes each address. After compiling a list of addresses which are being used and storing this list in the address file (508 in FIG. 5), the control program (502 in FIG. 5) then incrementally changes the address to an unused value and self-assigns this new address. The address file containing the address list is preferably stored temporarily in the LSD portion (328 of FIG. 3) of RAM and then stored statically as a data file on the storage medium. This latter initialization method avoids the possible user error of assigning the same communications link address to more than one disk drive. After initialization, each disk drive may query or "ping" the other disk drives for status. Alternatively, in a system having an architecture such as a SCSI or Fibre channel, the host normally maintains a data file containing the location of attached storage devices. A storage device having an LSD may retrieve the data file containing the location of attached storage devices from the host.

After initialization, a disk drive having an LSD may operate in both a passthru and a monitor mode. The passthru mode simply passes any requests from the host to the disk drive similar to operation of disk drives according to the prior art. In passthru mode the LSD is transparent to the host.

The monitor mode of an LSD includes the capability of monitoring the status of performance parameters such as available storage space, data traffic balance, seek duty cycle, and the like. Other aspects of the disk drive such as predictive failure indicators may also be routinely monitored. All of these parameters and aspects are generally referred to as monitored performance parameters (MPP).

Figure 6:
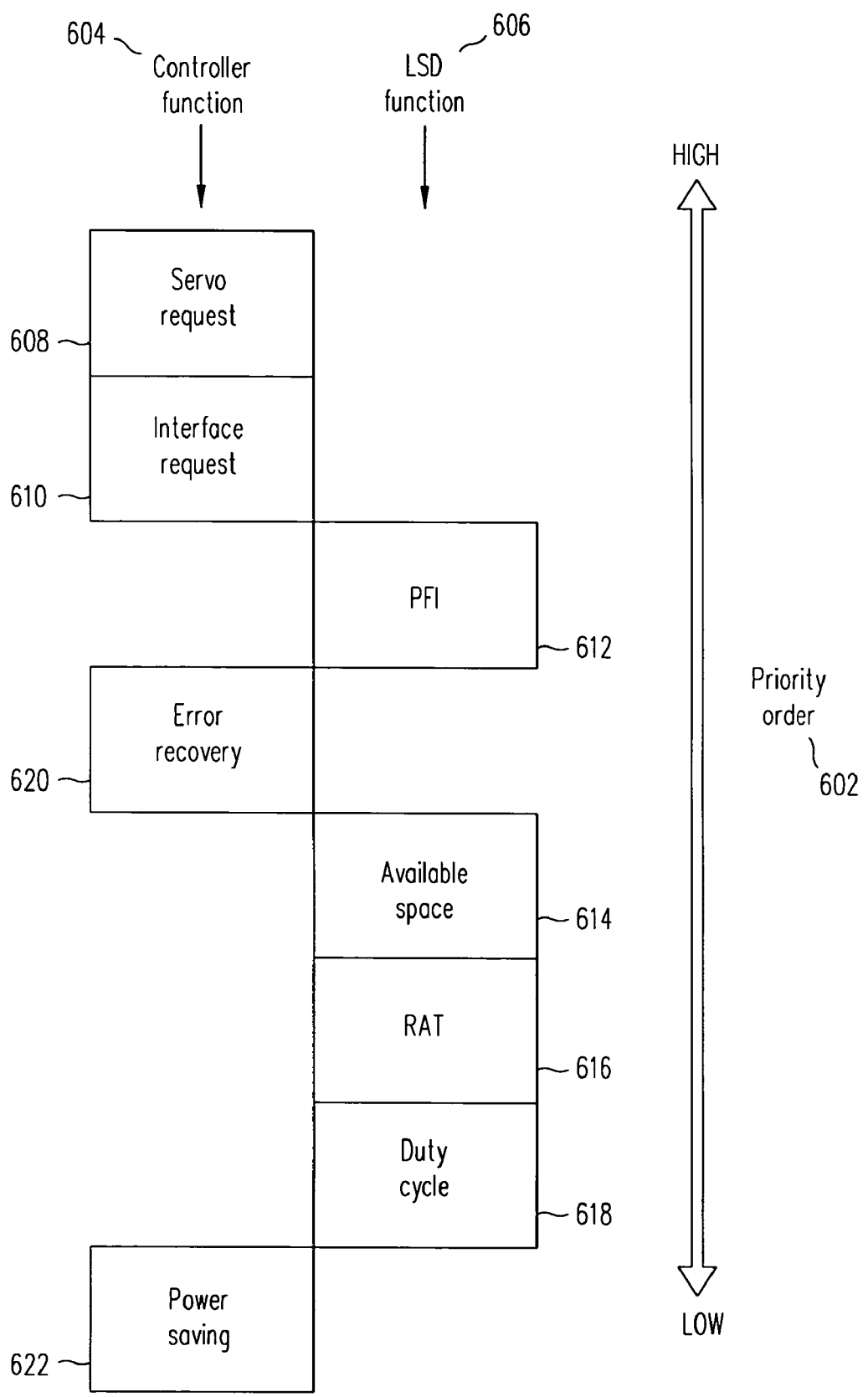
FIG. 6 illustrates some exemplary tasks and priority order which may be attended to by the controller and the LSD.

The controller of a storage device is typically a microprocessor. Therefore, the control of a disk drive is typically organized as a series of interrupt requests having different priorities. For example, the disk drive controller immediately attends to a critical interrupt request such as a track following correction or write inhibit which could have an immediate effect on the continued operation of the disk drive. In a preferred embodiment, the LSD operations are organized as an additional series of interrupt requests. FIG. 6 illustrates some examples of interrupt requests which are normally attended to by the disk drive controller 604 and some examples of interrupt requests which are attended to by the LSD 606. The interrupt requests illustrated in FIG. 6 are ranked according to an exemplary priority order 602. A high priority interrupt request such as a servo request 608 or an interface request 610 is ordinarily handled by the disk drive controller as quickly as the interrupt request is received. The LSD is configured to receive new interrupt requests corresponding to a series of MPP values. As illustrated in FIG. 6, the MPPs may include predictive failure indicators 612, available space indicators 614, routine actuator traffic 616, servo duty cycle 618, and the like. The priority order 602 is usually chosen beforehand. Each interrupt request 612, 614, 616, 618 handled by the LSD 606 may be have greater or less priority than a given interrupt request 608, 610, 620, 622 handled by the disk drive controller 604. The interrupt requests and the priority order illustrated in FIG. 6 are exemplary only and not intended to be an exhaustive compilation of all possible interrupt requests handled by either the disk drive controller or the LSD.

Figure 7A:
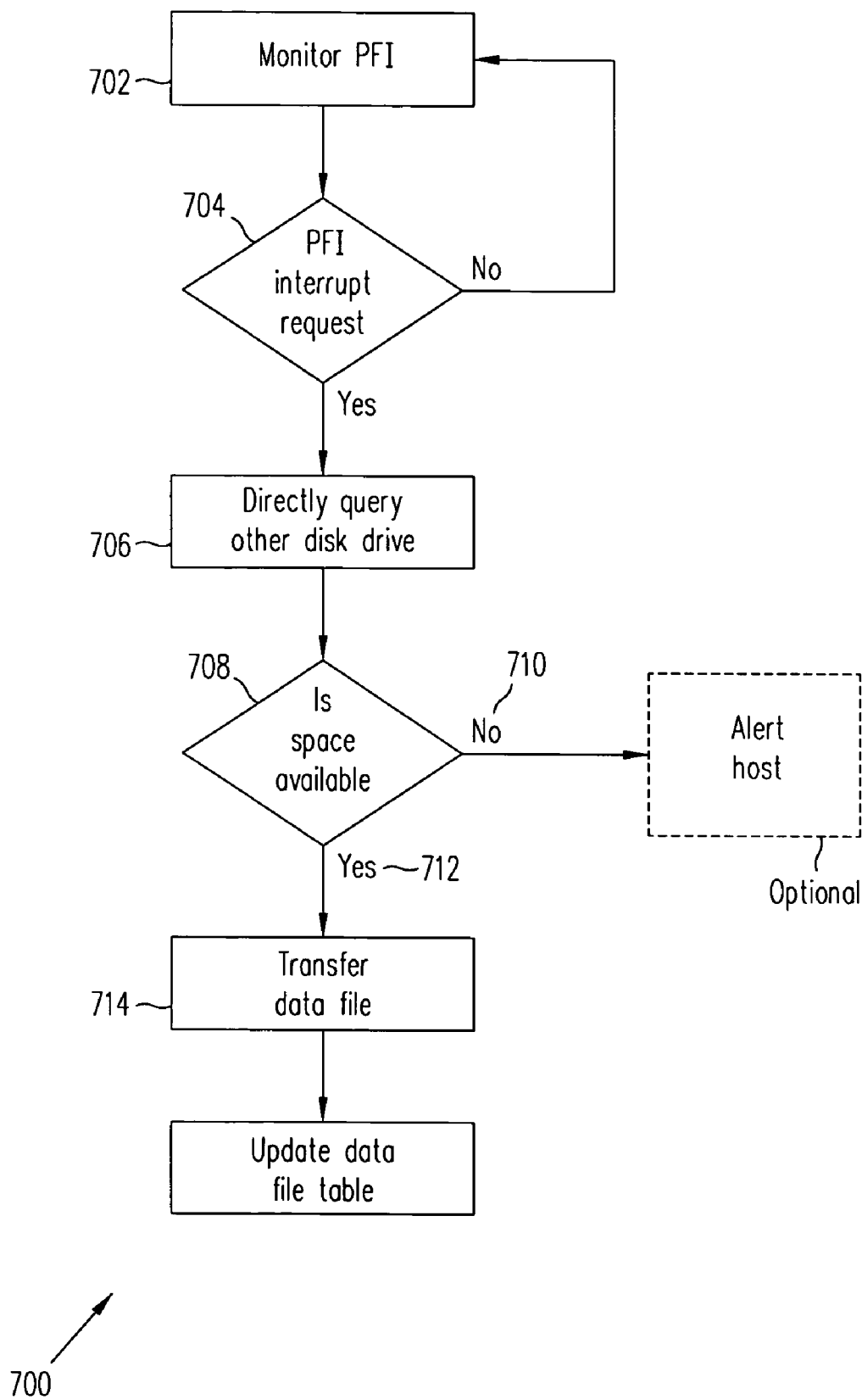
FIG. 7a illustrates an exemplary method which a disk drive having an LSD may use to monitor a PFI.

FIG. 7a illustrates an example of the method which an LSD uses to respond to a predictive failure indicator (PFI) interrupt request. Most contemporary disk drives have a capability of generating a signal or interrupt request which may be used to predict an impending failure of the disk drive. One such signal may be the signal from an acoustic emission sensor connected with the disk drive. An increase in the signal from an acoustic emission sensor may indicate a problem such as increased head-disk interaction, motor bearing wearout, or similar problem which could threaten the ability to retrieve stored data files. Another useful PFI signal is an increase in the soft error rate.

In the example illustrated in FIG. 7a, the control program (502 in FIG. 5) of the LSD continuously monitors the predictive failure indicator 702. If a PFI signal reaches a predetermined value then a PFI interrupt request is generated 704. The control program of the LSD then initiates a query 706 of other disk drives equipped with an LSD for available storage space. This query 706 is directly communicated from one disk drive to another via the communications link and does not involve the computational resources of the host or of any storage controller. The LSD of each queried disk drive consults the resident data file table (504 in FIG. 5) and reports the available storage space to the disk drive that initiated the query 708. If sufficient storage space is not available 710 in other disk drives then the disk drive which initiated the query may optionally send 710 an alert message of possible disk drive failure to the host. If sufficient storage space is available 712 in one or more disk drives then the disk drive which initiated the query self initiates a transfer 714 of the data files to the available space in the other disk drives. Because the data file transfer occurs directly from one disk drive to another disk drive via the communications link, fewer computational resources are used and the data file transfer speed is increased compared to using the computing resources of the host to affect the transfer. After the transfer of the data files, the data file tables (504 in FIG. 5) are updated 716 in the LSD of the disk drives that accepted data files. PFI interrupt requests are generally given relatively high priority since a failure may result in loss of data.

Figure 7B:
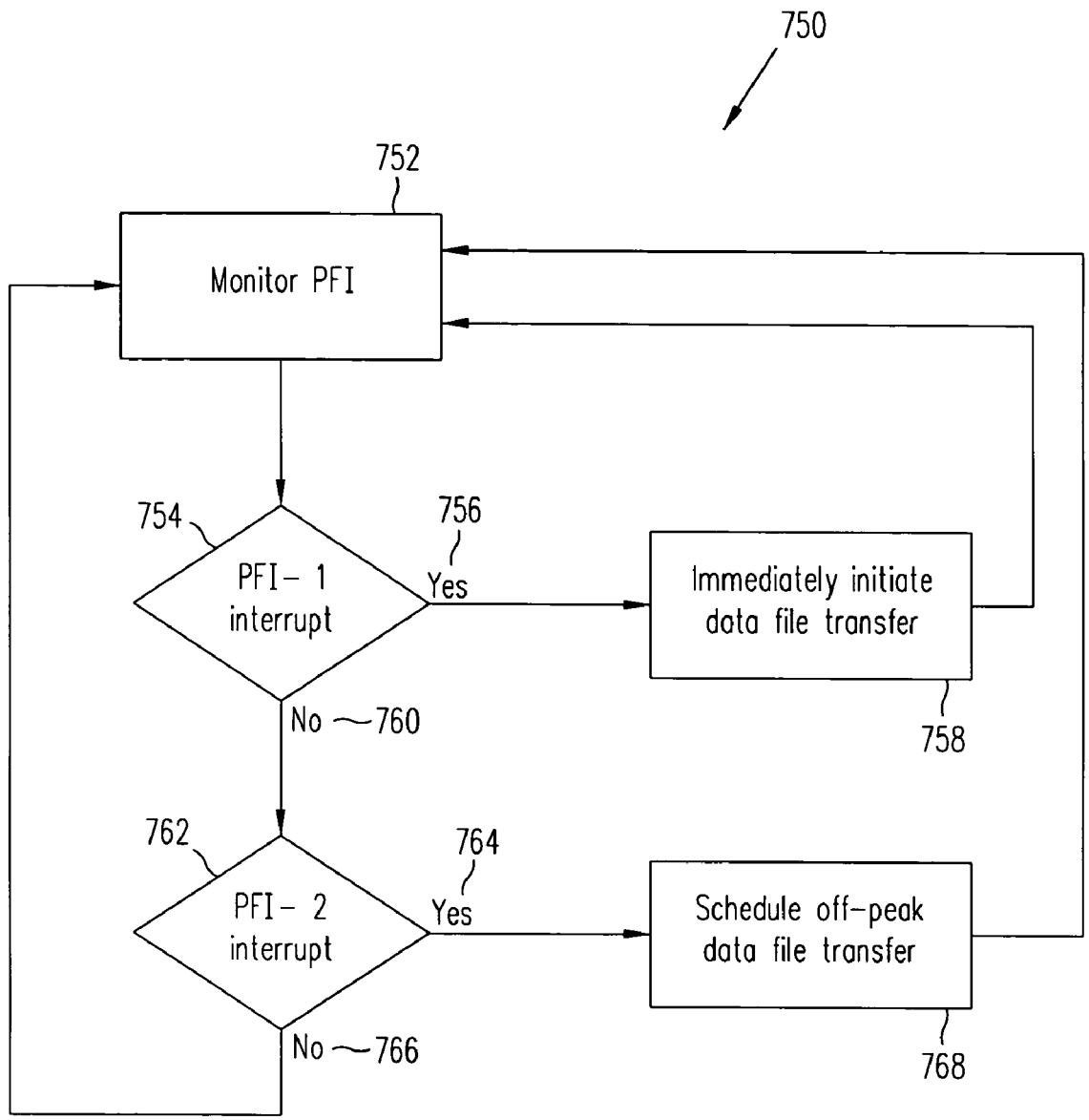
FIG. 7b illustrates an exemplary method which a disk drive having an LSD may use to attended to PFIs with differing priorities.

In another embodiment, the LSD has the capability of differentiating between different MPPs which have different degrees of importance. For example, based on the relative importance of different PFI indicators, the LSD may immediately initiate a data file transfer to another disk drive, or the LSD may schedule the transfer to occur later. FIG. 7b illustrates an example of one method which an LSD uses to respond to two predictive failure indicator (PFI) interrupt requests. In this example, PFI-1 is a high priority indicator such as a loss of servo performance, an indication of a recording head crashing into the disk, or the like. Initially, the LSD is in monitor mode 752. When the LSD determines 754 that an interrupt from a PFI-1 indicator has been received 756, the LSD immediately queries other disk drives for storage space and transfers data files 758 similar to the method illustrated in FIG. 7a. If an interrupt indicating a PFI-1 is not received 760, then the LSD may determine if an interrupt request from a PFI-2 indicator has been received 762. PFI-2 represents an indicator which does not necessitate an emergency response. Examples of PFI-2 indicators may include a mild increase in error rate, a slight increase in read element distortion, and the like. If an interrupt request 762 for a PFI-2 indicator has been received 764, then the LSD may schedule the data file transfer to occur during off-peak usage of the disk drive 768. Otherwise 766, the LSD returns to routine monitor mode.

Figure 7C:
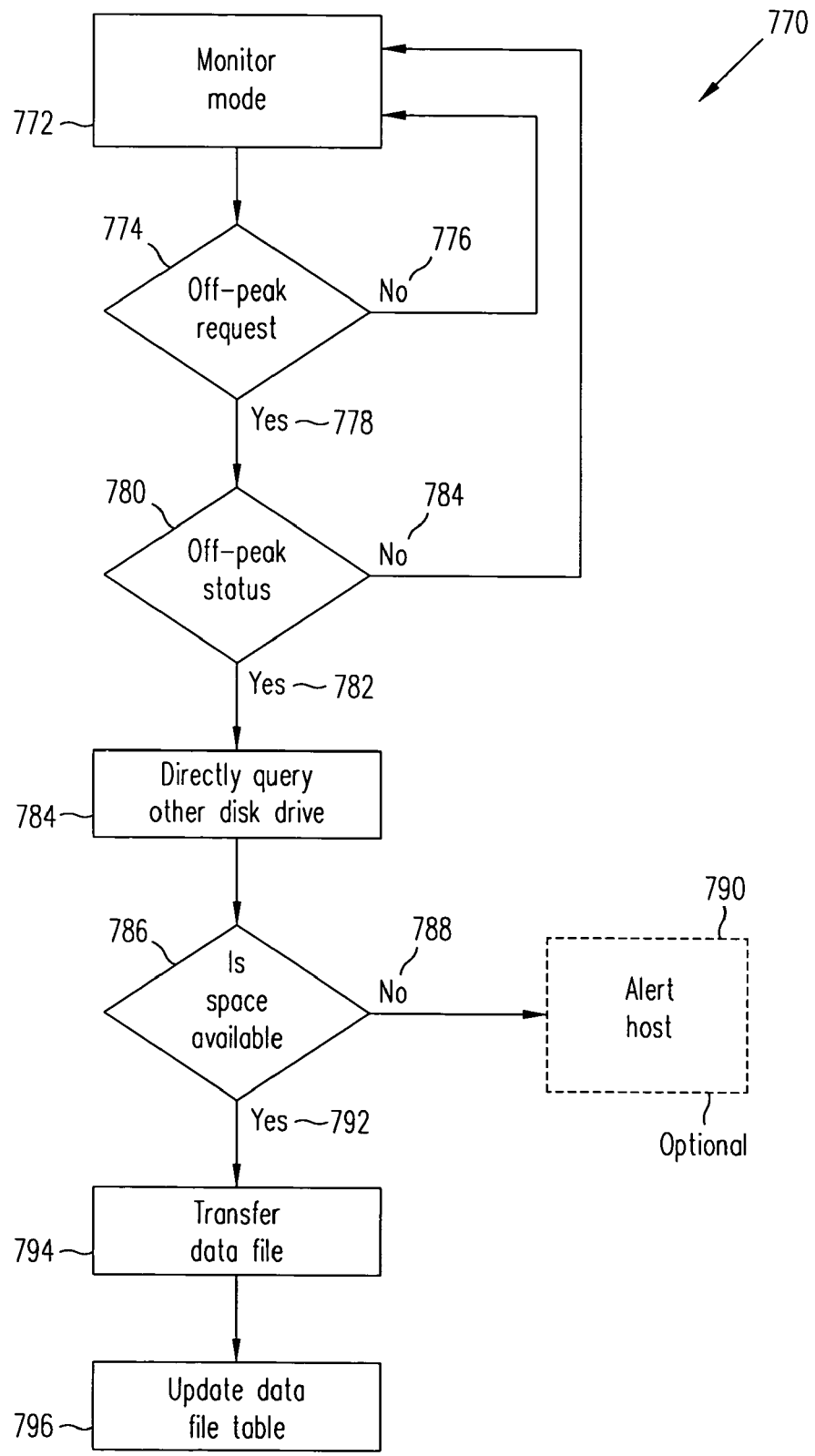
FIG. 7c illustrates an exemplary method which a disk drive having an LSD may use to transfer data files during off-peak periods.

FIG. 7c illustrates one method 770 of using an LSD to schedule off-peak data file transfers from one disk drive directly to one or more other disk drives. In monitor mode 772 the LSD determines if an off-peak interrupt request has been received 774. If not 776, then the LSD continues monitor mode 772. If an interrupt request for an off-peak transfer has been received 778, then the LSD determines if the disk drive is in off-peak status 780. There may be several convenient criteria for off-peak status, for example the disk drive may be in standby or idle mode, the servo seek density may be low, and the like. If the disk drive is not in off-peak mode 784, then the LSD continues in monitor mode 772. If the disk drive is in an off-peak condition 782, then the LSD queries one or more other disk drives 784 for available space. If there is no space available 788 to transfer data files, then optionally, the host may be alerted 790. If there is 792 sufficient space then the transfer of data files is initiated 794. After the transfer of the data files 794, the data file table is updated 796. Shifting the transfer of data files to occur during off-peak periods significantly improves the accessibility of the disk drives for host initiated operations.

Another example of an MPP is the remaining capacity of a disk drive. The remaining capacity of a disk drive is conveniently accomplished by querying the contents of data file table (504 in FIG. 5) which includes the location of each data file along with the size of each data file and comparing this information with the total capacity of the file. When the remaining capacity of the disk drive reaches a preset level, a remaining capacity interrupt request is generated, the control program of the LSD initiates a query of other disk drives having LSDs that are connected with the communications link. The preset level of the remaining capacity of the first disk drive may be expressed as an absolute remaining storage capacity such as 1 gigabyte or as a fraction such as 5%. If there is not sufficient remaining space in other disk drives to move data files from the first disk drive, then the host may be alerted. If there is sufficient space on other disk drives to accept some of the data files on the first disk drive, then the first disk drive transfers some of the data files and releases the storage capacity which was used for these files. After the transfer of the data files from the first disk drive, the data file tables in the LSDs of all the affected disk drives are updated.

Another example of an MPP is the routine actuator traffic (RAT) of a disk drive. One of the failure modes of a disk drive is wear out of the actuator bearings. The probably of failure is proportional to the number of seeks by the actuator. In normal use, a specific disk drive may have one particular data file which is requested often by the host. Consequently, the number of seek operations by the actuator may be very high compared with the other actuators in connected disk drives. The LSD may be configured to monitor the number of seeks per interval of time, also referred to as routine actuator traffic (RAT). When the RAT exceeds a present value an interrupt request is generated and the LSD can consult the file table to determine if one particular data file is responsible for the excessive traffic. If one particular data file is responsible, then the control program of the LSD initiates a query of other disk drives having LSDs that are connected with the communications link. If there is not sufficient remaining space in other disk drives to move data files from the first disk drive, then the host may be alerted. If there is sufficient space on another disk drive to accept the popular data file, then the first disk drive transfers some of the data files and releases the storage capacity which was used for these files. After the transfer of the data files from the first disk drive, the data file tables in the LSDs of all the affected disk drives are updated.

Another example of an MPP is the average duty cycle of the actuator. The average duty cycle of the actuator is defined as the amount of time that the coil is energized in seeking relative to the total operating time. During reading and idle modes the amount of current in the coil is very low. If the average duty cycle is high then there is significant heat dissipation within the disk drive. The additional heat in the disk drive may significantly disturb operation. The time the coil is actuating may be stored in a dedicated register in RAM. When the calculated average duty cycle becomes greater than a preselected value, then an interrupt request is generated. The LSD then follows the usual response to the interrupt request by sending a query to one or more other disk drives. If space is available then the files responsible for the high duty cycle are moved. Over time the average duty cycle of all the disk drives converge to the same value thus avoiding excessive wear to the actuator bearings of any one particular disk drive.

Figure 8:
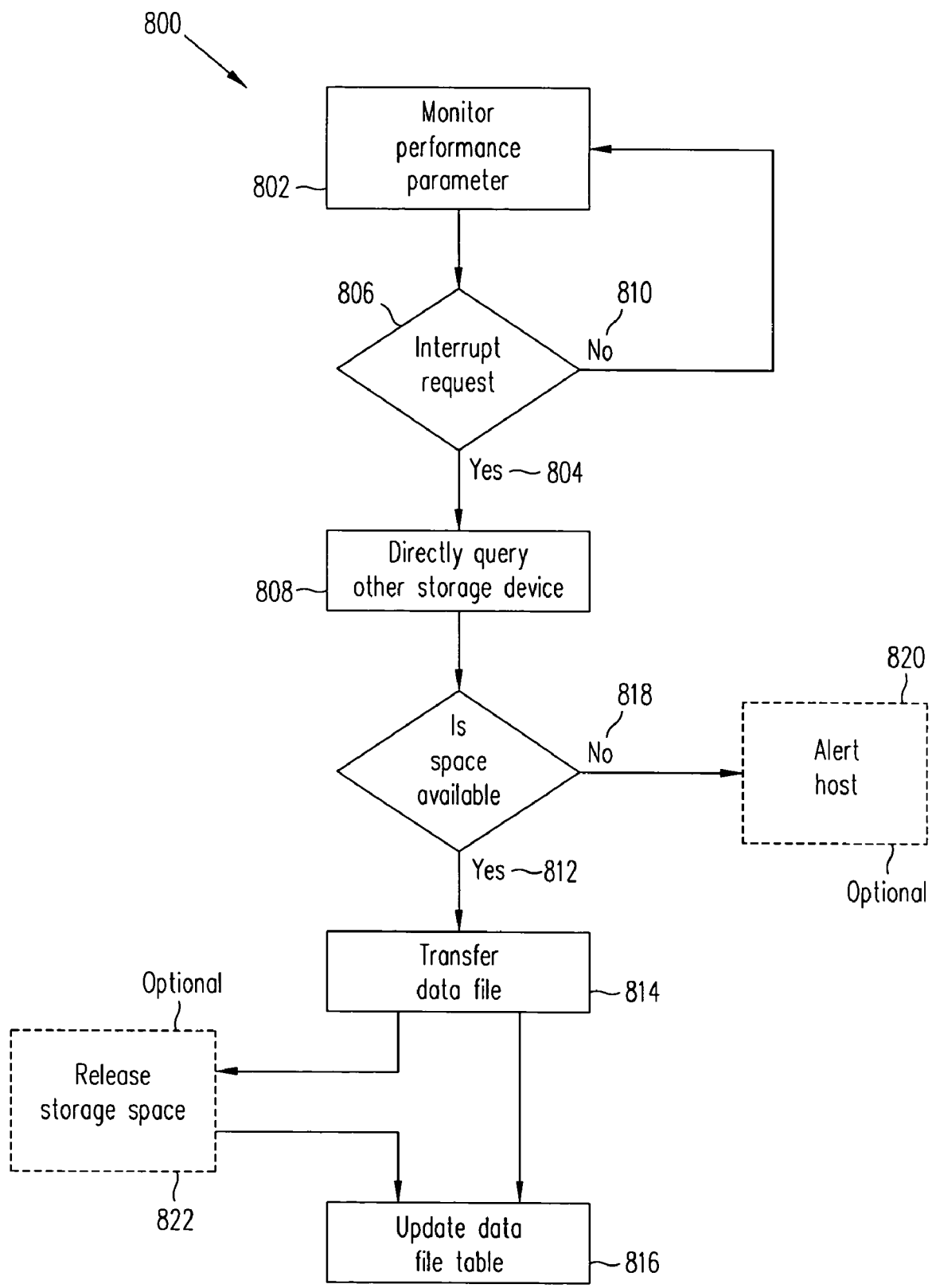
FIG. 8 illustrates an exemplary generalized method a storage device having an LSD may use to monitor a performance parameter.

FIG. 8 illustrates the general method 800 that a first storage device including an LSD uses to respond to an MPP. The particular storage device can be a disk drive, an optical drive, a tape drive, a flash memory device, or equivalent device for storing digital data. The LSD monitors an MPP 802. The MPP may be a predictive failure indicator, the remaining capacity of the storage device, actuator duty cycle, or other similar parameter important for operation or reliability. When in monitor mode, if the LSD receives 804 an interrupt request 806 then the LSD directly queries 808 a second storage device equipped with an LSD. If an interrupt request is not received 810 then the LSD continues to monitor 802 the performance parameter. If space is available 812 on the second storage device to accept at least one data file, then the first storage device transfers 814 at least one data file to the second storage device. The address files of both storage devices are updated 816. If space for a data file transfer is not available 818, then optionally, the host may be alerted 820. Storage devices having an LSD may independently initiate and transfer data files without a host being available. Also, optionally, the storage space in the first storage device may be released 822.

Figure 9:
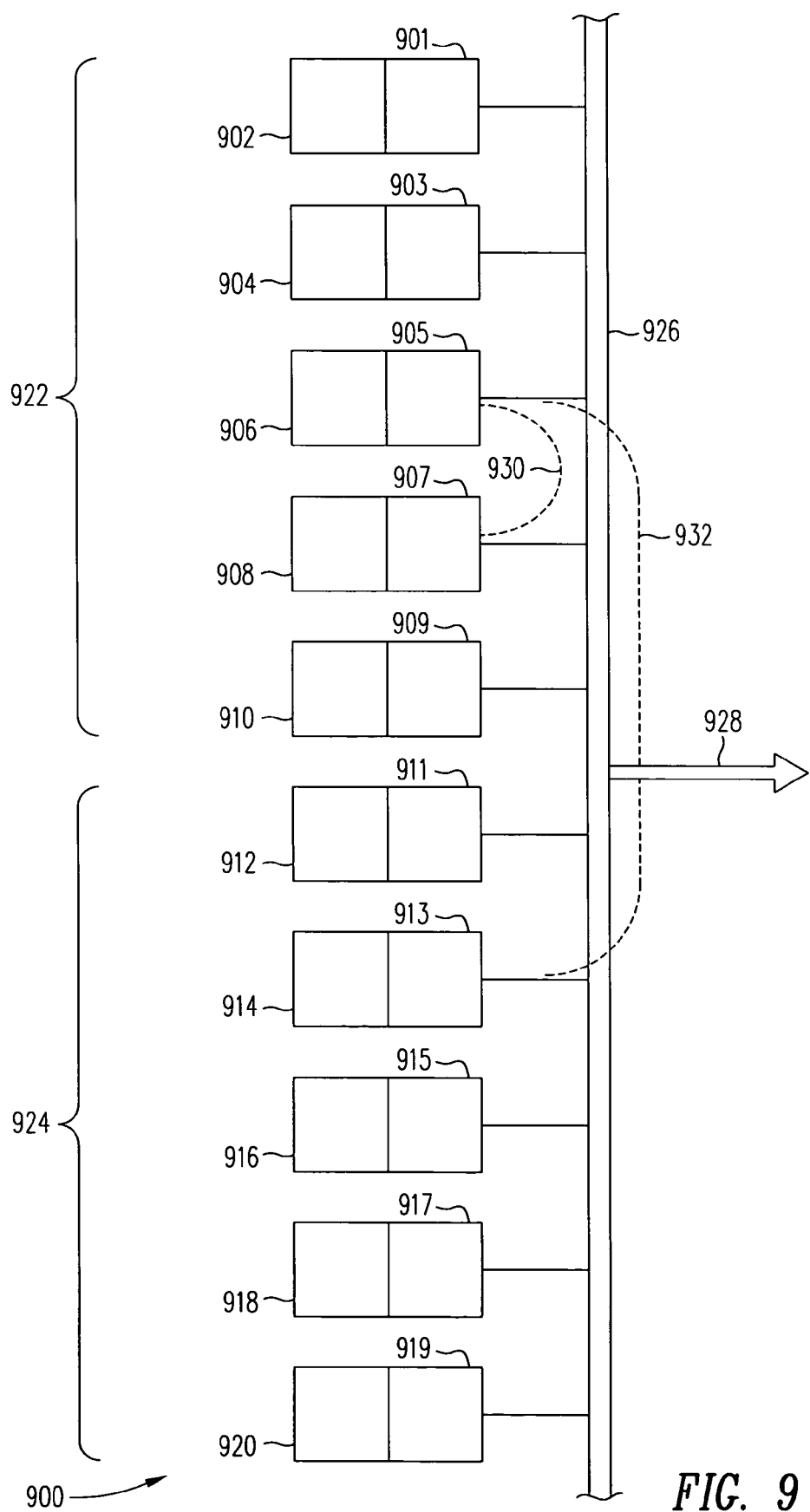
FIG. 9 illustrates a group of storage devices each of which have an LSD.

The embodiment of the invention illustrated in FIG. 4 is for the case of two disk drives each having an LSD in a computer system. While the invention applies to a relatively small system as illustrated in FIG. 4, the invention also applies to an arbitrarily large computer system having many disk drives. An embodiment of the invention having ten disk drives each having an LSD is illustrated in FIG. 9. Reference numbers 902, 904, 906, 908, 910, 912, 914, 916, 918, and 920 refer to the disk drives. Reference numbers 901, 903, 905, 907, 909, 911, 913, 915, 917, and 919 refer to the respective LSDs. Each of the disk drives is connected to the communications link 926. The communications link 926 is connected with a host or storage subsystem controller. Typically, in a larger array 900 of disk drives as illustrated in FIG. 9, the disk drives are organized into separate RAID groups. A RAID (redundant array of inexpensive disks) group, typically a group of about five disk drives, offers considerable protection of stored data. In a RAID group, a data file is distributed over all the disk drives. If one disk drive fails and the portion of the data file stored on that disk drive is not recoverable, then the complete data file may be reconstructed from the portions stored on the other disk drives. In FIG. 9, one RAID group 922 consists of disk drives 902, 904, 906, 908, and 910. Another RAID group 924 consists of disk drives 912, 914, 916, 918, and 920.

In a typical RAID application, a subsystem controller (not shown in FIG. 9) parses a data file from the host into portions to be stored on each of the disk drives in the RAID group. However, embodiments of the present invention do not depend on the organization of disk drives into RAID groups. The LSD of a specific disk drive may query any disk drive which has a specific address and is connected with the communications link. For example, referring to FIG. 9, if the LSD 905 of disk drive 906 in monitor mode decides to query the other disk drives connected with the communications link 926, the LSD 905 may query the LSD 907 of disk drive 908 along the path indicated by reference number 930. Disk drive 908 happens to be in the same RAID group 922 as disk drive 906. Alternately, the LSD 905 of disk drive 906 may query the LSD 913 of disk drive 914 along the path indicated by reference number 932. Disk drive 914 is in a different RAID group 924 than the RAID group 922 of disk drive 906.

Figure 10:
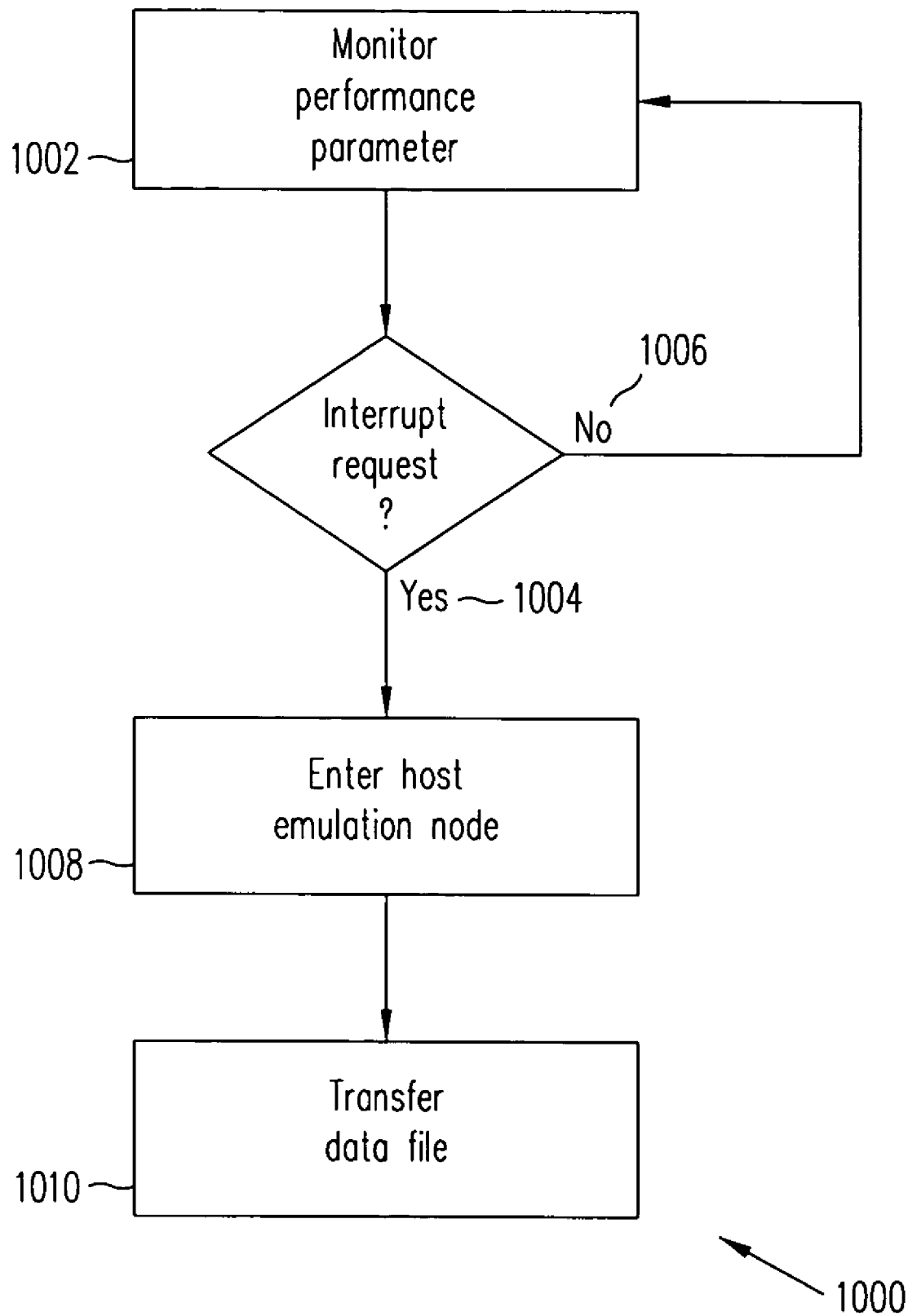
FIG. 10 illustrates method of using a host emulation mode whereby a storage device having an LSD may transfer a data file directly to a storage device not equipped with an LSD.

Another embodiment of the invention provides a host emulation mode for an LSD. The host emulation mode is useful when a storage device with an LSD transfers data files directly to a storage device that does not have an LSD. FIG. 10 illustrates an exemplary method 1000 used when a first storage device having an LSD uses a host emulation mode to transfer a data file directly to a second storage device that does not have an LSD. The first storage device is monitoring a performance parameter 1002. If an interrupt request is not received 1006 then the first storage device remains in monitor mode 1002. If an interrupt request is received 1004, then the first storage device enters into host emulation mode 1008. In host emulation mode, the first storage device transfers a data file directly to the second storage device along with the command to store the data file 1010. The second storage device recognizes a command to store a data file. This command is indistinguishable to the second storage device as coming from either a host or from a storage device having an LSD.

The invention is not limited to the specific embodiments and examples described above. For example, in a simple computer system having a single disk drive and a single writeable CD storage device, both the disk drive and the CD storage device may be equipped with an LSD to directly transfer data files from the disk drive to the CD storage device. Many changes and modifications can be made without departing from the scope of the invention as defined in the claims.

I claim:

1. A computer system, comprising:
a storage controller;
a plurality of storage devices, each having a lateral storage director (LSD);
a communications link for communicating between the storage controller and the plurality of storage devices;
a host for commanding the storage controller to pass data files to or from one or more of the plurality of storage devices via the communications link; and
the LSDs in the plurality of storage devices also operate and communicate directly with each other over the communications link without requiring involvement of or communication with the storage controller or host such that the plurality of storage devices self-initiate tasks independently of the storage controller and the host.

2. A computer system according to claim 1, wherein each of the plurality of storage devices has its own storage device controller, and the LSDs are programs of computer commands usable by respective ones of the storage device controllers.

3. A computer system according to claim 1, wherein each of the LSDs are separately embodied as individual microprocessors that are physically separate from respective ones of the storage devices.

4. A computer system according to claim 1, wherein each LSD has a unique communications link address, the LSDs accept queries directly from other ones of the LSDs via the communications link without involvement of the storage controller or the host, and the LSDs transfer data files directly to other storage devices that are not equipped with LSDs such that the LSDs issue host emulating commands.

5. A computer system according to claim 1, wherein each LSD includes a data file table and self-monitors a performance parameter on respective ones of the storage devices independently of and without communicating with the storage controller or the host.

6. A computer system according to claim 1, wherein each LSD determines an available storage space on respective ones of the storage devices independently of and without communicating with the storage controller or the host.

7. A computer system according to claim 1, wherein the plurality of storage devices are selected from the group consisting of disk drives, tape drives, and optical drives.

8. A computer system, comprising:
a storage controller;
a plurality of storage devices, each having a lateral storage director (LSD);
a communications link for communicating between the storage controller and the plurality of storage devices;
a host for commanding the storage controller to pass data files to or from one or more of the plurality of storage devices via the communications link;
the LSDs in the plurality of storage devices also operate and communicate directly with each other over the communications link without requiring involvement of or communication with the storage controller or host such that the plurality of storage devices self-initiate tasks independently of the storage controller and the host; and
each LSD has a unique communications link address such that the LSDs accept queries directly from other ones of the LSDs via the communications link without involvement of the storage controller or the host, and the LSDs transfer data files directly to other storage devices that are not equipped with LSDs such that the LSDs issue host emulating commands; and each LSD determines an available storage space on respective ones of the storage devices independently of and without communicating with the storage controller or the host.

9. A computer system according to claim 8, wherein each of the plurality of storage devices has its own storage device controller, and the LSDs are programs of computer commands usable by respective ones of the storage device controllers.

10. A computer system according to claim 8, wherein each of the LSDs are separately embodied as individual microprocessors that are physically separate from respective ones of the storage devices.

11. A computer system according to claim 8, wherein each LSD includes a data file table and self-monitors a performance parameter on respective ones of the storage devices independently of and without communicating with the storage controller or the host, the performance parameter being selected from the group consisting of data traffic balance, seek duty cycle, and predictive failure indicators.

12. A computer system according to claim 8, wherein the plurality of storage devices are selected from the group consisting of disk drives, tape drives, and optical drives.

* * * * *